July 29, 1952  P. A. MARSAL  2,605,298
DRY CELL
Filed Nov. 5, 1949
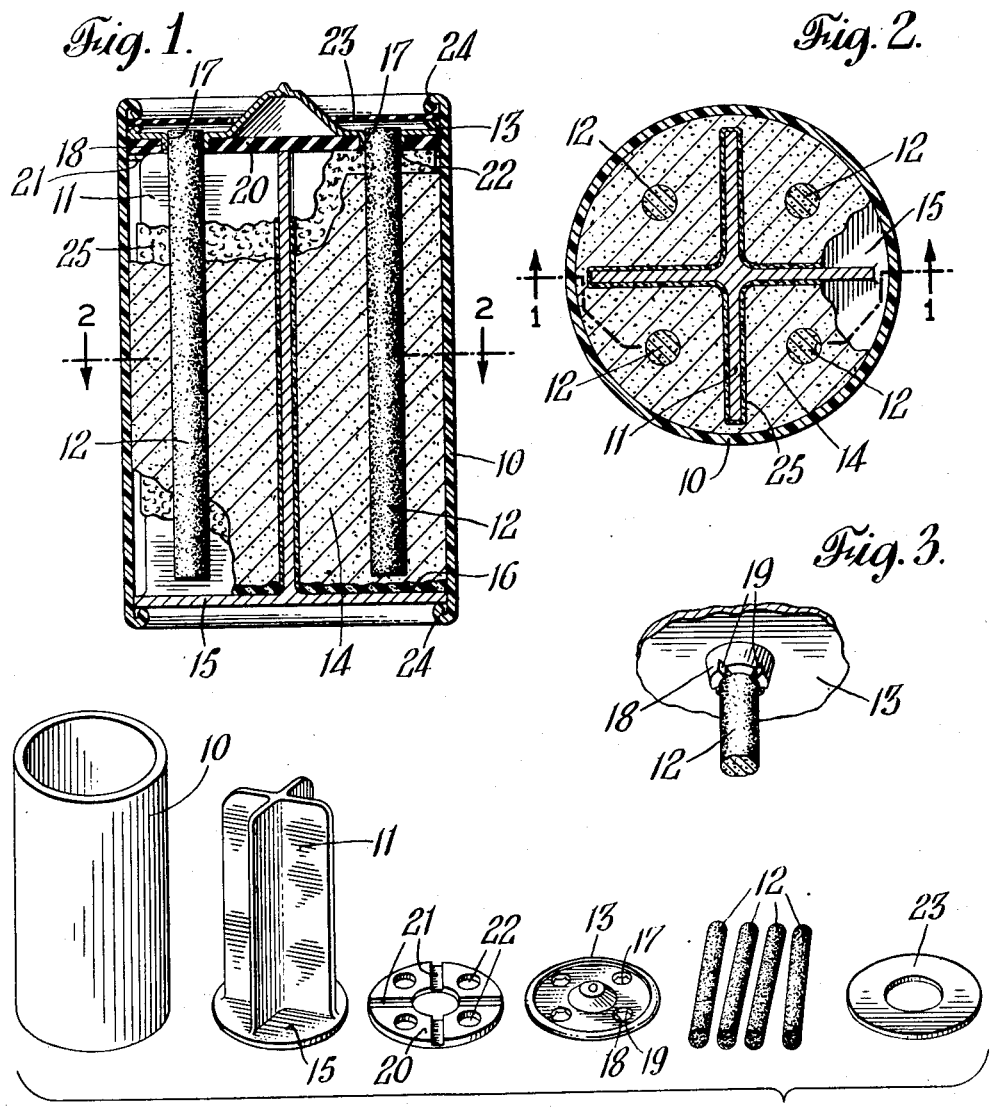
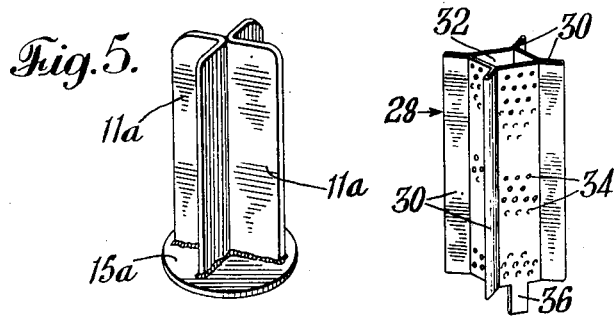
INVENTOR
PAUL A. MARSAL
BY
D.C. Harrison
ATTORNEY Patented July 29, 1952

2,605,298

UNITED STATES PATENT OFFICE 2,605,298

DRY CELL

Paul A. Marsal, Rocky River, Ohio, assignor, by mesne assignments, to Union Carbide and Carbon Corporation, a corporation of New York Application November 5, 1949, Serial No. 125,710

6 Claims. (Cl. 136—107)

The invention relates to dry galvanic cells of the Le Clanche type.

A common type of dry cell is cylindrical in form, and comprises a zinc cup which constitutes the anode and container, and an axially disposed carbon rod which for brevity will be herein called the cathode although, strictly speaking the cathode includes both the carbon rod and the carbon-containing depolarizing mix which ordinarily occupies the space between the rod and the zinc cup. The electrolyte is held by absorption in the depolarizing mix. The bottom of the zinc cup forms one terminal while a metal cap on the upper end of the carbon rod is the other terminal. When such cells are to be connected in series circuit they can be arranged coaxially in anode-to-cathode contact; if to be connected in parallel circuit they can be individually inserted between suitably placed and electrically connected pairs of contacts, at least one contact of each pair being usually resiliently mounted.

Cells of the kind described above are subject to the objection that continued action of the electrolyte, even during non-use of the cell, tends to perforate the zinc cup, thus permitting the electrolyte to escape and damage adjacent apparatus. Also, the active electrode surfaces, particularly that of the anode, are of smaller area than is desirable. In prior designs intended to increase the electrode surfaces, one or more of the following disadvantages have been encountered: (1) the electrodes become complex in shape, and hence unduly expensive; (2) the shape of the electrodes interferes with the manufacture of the cell; and (3) the cell terminals are displaced from their usual positions so that the cells cannot be used in existing devices.

An object of my invention is to provide a dry cell in which at least the major portion of the container is resistant to electrolyte action. A further object is to provide greater anode surface than is afforded by the usual simple zinc cup, and preferably to increase the cathode surface as well. Still another object is the provision of an air space centrally located with the cell for the reception of liquid released during cell operation. The foregoing objects are attained in the dry cell now to be described without unduly complicating the manufacturing operations, and without displacing the terminals from their usual positions.

The accompanying drawing shows a dry cell exemplifying my invention. In the drawing:

Fig. 1 is in part a vertical section along the line 1—1 of Fig. 2;

Fig. 2 is a horizontal section along the line 2—2 of Fig. 1;

Fig. 3 shows a detail of the cathode assembly;

Fig. 4 is an exploded view showing separated parts of the cell;

Fig. 5 shows an alternative form of anode; and

Fig. 6 shows another alternative form of anode.

The principal parts of the cell illustrated are the non-conductive container 10, preferably composed of plastic; the anode 11 having radial vanes or fins, and preferably composed of zinc; the cathode assembly consisting of the carbon rods 12 held in the conductive disc 13; and the depolarizing mix 14, which may be of any suitable composition.

The anode is provided with an end plate 15 which preferably fits the inside of member 10. End plate 15 may consist of zinc or other metal, for example terne plate, and it may be integral with the rest of the anode, or welded, soldered or otherwise attached thereto. The active anode surface may include the upper surface of plate 15, as when the plate is integral with the fins. In such case the plate can be made sufficiently thick to insure against its perforation by electrolytic action. If the end plate contains a metal other than that of the anode fins, or if it is soldered to the fins, the end plate and solder are protected from electrolytic action by a layer 16, preferably of wax or other plastic material. It will be clear that layer 16, when used, forms a part of the cell container.

The disc 13 has a hole 17 for each of the rods 12. These holes have skirts 18 (best shown in Fig. 3) which are split at 19 in such manner as to give fingers having some resiliency. By this means it has been found possible to hold the rods 12 firmly in the disc 13. The latter is provided with a central boss which serves as the cathode terminal of the cell.

At their upper ends the electrodes engage the insulating washer 20, having grooves 21 to receive the upper edges of the anode fins. By means of holes 22 through which rods 12 pass, the latter are symmetrically located with respect to the anode fins.

The cell may be closed at its upper end in any suitable way, as by washer 23. The cell can readily be designed to use a metal washer at this point, if desired. The parts of the cell are held in place by rolling or crimping the ends of the member 10 as shown at 24.

The anode can be manufactured in a variety of ways. For example, the finned portion can be extruded or die-cast integral with the end plate 15, or the finned portion can be made and thereafter attached to the end plate. The anode can also be prepared by forming channels from zinc strip, and attaching them at one end to the end plate in the manner clearly shown in Fig. 5. Still another form of anode is shown in Fig. 6. In this form, an anode 28 is so fabricated, for example by folding a strip of zinc, as to provide fins 30 and a cavity 32 preferably centrally and longitudinally located as shown. The walls of the anode defining the cavity 32 are preferably provided with perforations 34 communicating with the cavity 32 for a purpose to be explained below. A tab 36 is provided at one end of the anode 28 and is adapted to be folded for attachment as by soldering or welding to a bottom plate not shown. Or the fins 30 may be attached to a bottom plate in the manner illustrated in Fig. 5. However made, the anode will be provided, as by wrapping, spraying or dipping, with a coating 25 of paper or other bibulous material. Many materials and methods for this purpose are known in the art, and these form no part of the invention.

The cells embraced by my invention can be manufactured by various simple and economical processes, for example: The container 10 is crimped at one end, and the anode 11 set in its place. The material for layer 16, if used, is then introduced. This material if a fusible solid, is preferably in granular or pelleted form; or it may be a liquid. It may be conditioned by warming the cell in some cases. Other compositions will set or cure on standing without other treatment. The depolarizing mix is then introduced into the unobstructed longitudinal passages in the anode. The mix may have such a consistency that the rods 12 can readily be forced through it. The washer 20 can be fitted to either the anode or the cathode before the latter is inserted. The cell is completed by inserting washer 23, and crimping the upper end of member 10.

The cross-section of the cell is not necessarily circular: it may take rectangular or other shapes.

As is well known, dry cells tend to exude liquid upon discharge and for this reason it is conventional to provide a so-called "air-space" for the reception of such liquid. In accordance with this invention, an air space may be provided centrally of the cell by the use of the hollow anode 28 illustrated in Fig. 6. The perforations 34 of the walls of the anode which define the cavity 32 provide for access of any exudant to the cavity 32 where such exudant is retained.

As compared with dry cells of the prior art the invention makes it possible to increase the cathode surface without increasing the weight of carbon rod used; to provide more anode surface with less zinc; and to increase the quantity of depolarizing mix. These increments result in substantial improvements in service life. A permanently non-leaking cell is provided, and the cell, if of the usual dimensions and cylindrical shape, is interchangeable with the cylindrical dry cells now on the market.

This application is in part a continuation of my copending application Serial No. 666,737, filed May 2, 1946, now abandoned.

I claim:

1. In a dry cell an anode having fins defining unobstructed longitudinal passages; a cathode comprising a plurality of carbon rods symmetrically disposed with respect to said anode; an electrically insulating non-corrodible container; a conductive member connecting and supporting said rods and having an exposed portion providing a central contact at one end of the cell and closing an end of said container; and a metal plate attached to said anode closing another end of said container and providing electrical contact with said anode.

2. In a dry cell, a container at least the inner surface of which is inert to battery electrolyte, a carbon cathode, an anode, and an electrolyte disposed between said cathode and anode; said anode having a central cavity devoid of electrolyte, the walls of said anode defining said cavity and extending below the surface of said electrolyte being perforated, the perforations in said walls being covered with a bibulous material.

3. In a dry cell an anode having a central cavity devoid of electrolyte, a carbon cathode symmetrically disposed with respect to said anode; an electrolyte disposed between said anode and said cathode; the walls of said anode defining said cavity and extending below the level of the electrolyte being perforated, the perforations in said walls being covered with a bibulous material; an electrically insulating non-corrodible container; a conductive member connected to said cathode and having an exposed portion providing a contact at one end of the cell and closing an end of said container, and a metal plate attached to said anode closing another end of said container and providing electrical contact with said anode.

4. In a dry cell an anode having a central cavity, the walls of said anode defining said cavity being perforated; a cathode comprising a plurality of carbon rods symmetrically disposed with respect to said anode; an electrically insulating non-corrodible container; a conductive member connecting and supporting said rods and having an exposed portion providing a central contact at one end of the cell and closing an end of said container; and a metal plate attached to said anode closing another end of said container and providing electrical contact with said anode.

5. In a dry cell an anode having fins defining unobstructed longitudinal passages and a central, longitudinal cavity, the walls of said anode defining said cavity being perforated; a cathode comprising a plurality of carbon rods symmetrically disposed with respect to said anode; an electrically insulating non-corrodible container; a conductive member connecting and supporting said rods and having an exposed portion providing a central contact at one end of the cell and closing an end of said container; and a metal plate attached to said anode closing another end of said container and providing electrical contact with said anode.

6. In a dry cell an anode having a central cavity, the walls of said anode defining said cavity being perforated, the perforations in said walls being covered with a bibulous material; a cathode comprising a plurality of carbon rods symmetrically disposed with respect to said anode; an electrically insulating non-corrodible container; a conductive member connecting and supporting said rods and having an exposed portion providing a central contact at one end of the cell and closing an end of said container; and a metal plate attached to said anode closing another end of said container and providing electrical contact with said anode.

PAUL A. MARSAL.

REFERENCES CITED

The following references are of record in the file of this patent:

UNITED STATES PATENTS

| Number | Name | Date |
|---|---|---|
| 368,608 | Peyrusson | Aug. 23, 1887 |
| 680,848 | Erny | Aug. 20, 1901 |
| 1,015,317 | Humel | Jan. 23, 1912 |
| 1,196,611 | Tossin | Aug. 29, 1916 |
| 1,481,145 | Pepper | Jan. 15, 1924 |
| 2,212,054 | Spicer | Aug. 20, 1940 |
| 2,315,592 | Cargill | Apr. 6, 1943 |

FOREIGN PATENTS

| Number | Country | Date |
|---|---|---|
| 864,533 | France | Jan. 21, 1941 |